United States Patent [19]

Scanzillo

[11] Patent Number: 5,344,557
[45] Date of Patent: Sep. 6, 1994

[54] INCUBATOR FOR BIOLOGICAL CLEANING OF FLUIDS

[75] Inventor: Joseph G. Scanzillo, Scituate, Mass.

[73] Assignee: Scanzillo Corp., Scituate, Mass.

[21] Appl. No.: 965,734

[22] Filed: Oct. 23, 1992

[51] Int. Cl.$^5$ ............................................ C02F 3/06
[52] U.S. Cl. ........................................ 210/94; 210/150;
210/242.1; 210/602; 210/170; 435/264
[58] Field of Search ............ 210/150, 151, 170, 242.1,
210/242.2, 205, 220, 615, 617, 602, 94; 435/262,
262.5, 264, 287, 288

[56] References Cited

U.S. PATENT DOCUMENTS

| | | | |
|---|---|---|---|
| 3,235,234 | 2/1963 | Beaudoin | 261/24 |
| 3,322,410 | 5/1967 | Ahlenius | 261/92 |
| 3,589,997 | 6/1971 | Grutsch | 210/219 |
| 3,664,647 | 5/1972 | Snow et al. | 261/30 |
| 3,720,317 | 3/1973 | Wittinger | 210/94 |
| 3,768,200 | 10/1973 | Klock | 210/602 |
| 3,984,323 | 10/1976 | Evens | 210/220 |
| 4,072,612 | 2/1978 | Daniel | 210/169 |
| 4,086,306 | 4/1978 | Yoshinaga | 210/220 |
| 4,191,479 | 3/1980 | Shuck et al. | 366/101 |
| 4,350,589 | 9/1982 | Stog | 210/242.2 |
| 4,446,236 | 5/1984 | Clyde | 210/150 |
| 4,482,510 | 11/1984 | Khudenko | 210/242.2 |
| 4,564,447 | 1/1986 | Tiedemann | 210/220 |
| 4,582,609 | 4/1986 | Hunter, III et al. | 210/170 |
| 4,600,694 | 7/1986 | Clyde | 210/151 |
| 4,670,149 | 6/1987 | Francis | 210/150 |
| 4,810,385 | 3/1989 | Hater et al. | 210/150 |
| 4,990,449 | 2/1991 | Caissel | 210/617 |
| 4,995,980 | 2/1991 | Jaubert | 210/150 |
| 5,087,353 | 2/1992 | Todd et al. | 210/94 |
| 5,122,266 | 6/1992 | Kent | 210/150 |
| 5,202,027 | 4/1993 | Stuth | 210/151 |

FOREIGN PATENT DOCUMENTS

| | | |
|---|---|---|
| 1377571 | 2/1965 | France . |
| 195735 | 1/1922 | United Kingdom . |

*Primary Examiner*—Christopher Upton
*Attorney, Agent, or Firm*—Wolf, Greenfield & Sacks

[57] ABSTRACT

A fluid incubation apparatus has a frame defining a chamber and is capable of floating or being suspended below the surface of the fluid to be cleaned.

The frame defines a chamber having a top, bottom and sides, with at least one of the sides and/or top being light transmissive. The ends of the chamber are preferably open to provide for flow therethrough. Disposed intermediate between the ends of the chamber is a means for enhancing the growth of biocatalysts present in the fluid. This means is preferably a particulate matrix made of biologically inert material for enhancing the surface area available for growth of biocatalysts. The chamber can also be supplied with one or more pumps for pumping growth media (i.e. atmospheric air and/or oxygen, fluid, nutrients) into the fluid-filled chamber. These pumps can also enhance the flow of fluid through the chamber under stagnant fluid conditions. A pump carried on the frame can have an air intake above the water level when the frame is floating.

9 Claims, 1 Drawing Sheet

INCUBATOR FOR BIOLOGICAL CLEANING OF FLUIDS

BACKGROUND OF THE INVENTION

It is well known that aeration of fluids will lead to the multiplication of microorganisms such as bacteria, fungi, and/or protozoa. These microorganisms are hereinafter referred to as "biocatalysts". The metabolic activity of these leads to the cleaning of the fluid, i.e. the oxidation of organic matter dissolved or suspended in the fluid.

Aeration is generally carried out by injecting air under pressure into the water to form bubbles or by allowing water to flow rapidly on and/or through surfaces or substrates. Accordingly, efficient and reliable aerating equipment is required to adequately aerate large volumes of fluids such as in a modern waste treatment plant. Current practice is to direct air into holding lagoons or tanks as bubbles so that they will pass upwards through the body of liquid and thereby oxidize any suspended organic matter.

This process is not entirely satisfactory since such aeration devices are often complex and rapidly become clogged due to suspended particulate material. Moreover, the mere presence of increased amounts of air will not always guarantee appropriate growth conditions for a particular biocatalyst. Rapid evolution of bubbles from an air pump will often dislodge microorganisms attached to solid surfaces, thus defeating the intended purposes of the aeration.

SUMMARY OF THE INVENTION

The present invention is an incubator for biological cleaning of polluted fluids. The incubator comprises a chamber disposed in the polluted fluid and enclosing a volume of polluted fluid. The chamber has lateral boundaries and opposed ends. Preferably, the ends are open so that the chamber is constructed to allow polluted fluid to flow from end to end within the chamber. Preferably, at least one lateral boundary of the chamber is transmissive to light. Disposed intermediate to the ends of the chamber is a particulate matrix designed to enhance growth of biocatalysts present in the fluid, by increasing the surface area available for biocatalyst growth. Preferred matrices are biologically inert and include configurations such as geometrical shapes, mesh, spheres, and honeycomb structures.

In further embodiments of the incubator, at least one buoyancy device is provided to the chamber. In other embodiments, at least one pump is also provided to the chamber. The pump provides growth media (oxygen, nutrients and/or fluid) to the chamber.

DETAILED DESCRIPTION OF THE INVENTION

Figure 1:
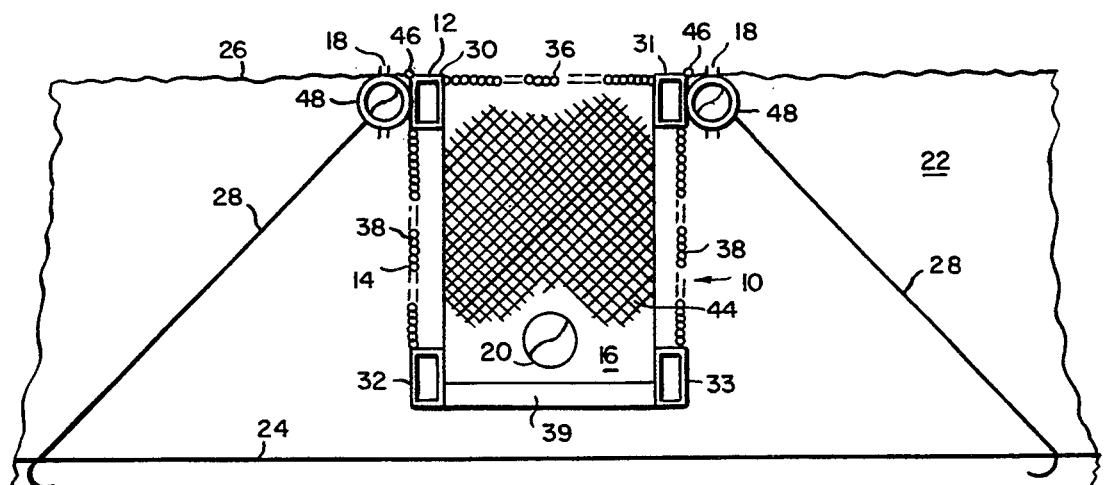
FIG. 1 is a schematic illustration of an end view of an incubator of the invention.

FIG. 1 portrays an end view of, an embodiment of the present incubator 10, comprising a frame 12 defining a chamber 14 for enclosing a given volume of fluid 16, a buoyancy device 18 associated with the frame, and a pump 20. The entire incubator 10 sits in a body of fluid 22 to be cleaned, the body of fluid having a bottom 24 and a top surface level 26. The incubator further can include a guy or mooring 28 for affixing or tethering the incubator 10 to a solid support such as, for example, the bottom 24 of the fluid, or a fixed object such as a pier or a boat.

Figure 2:
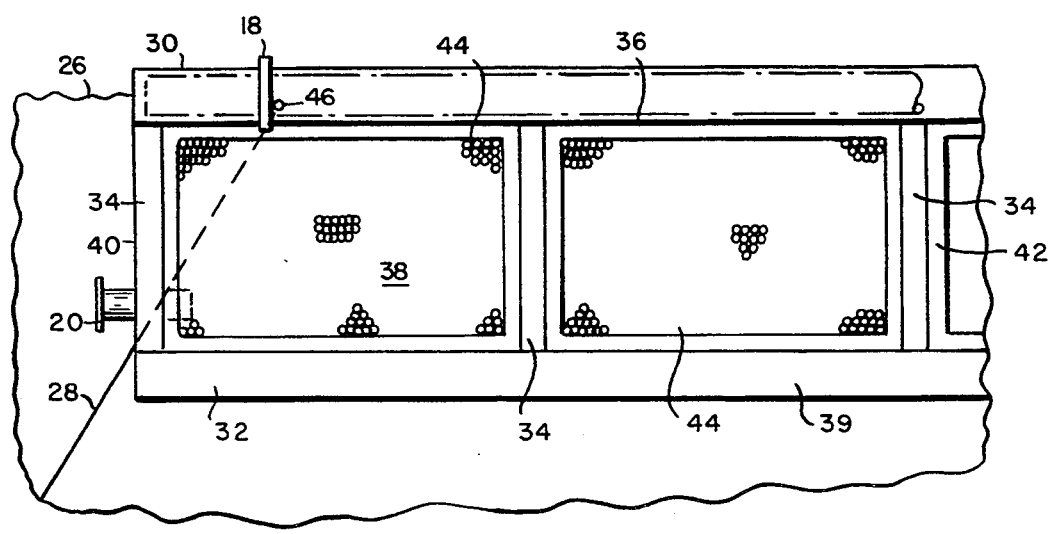
FIG. 2 is a schematic illustration of a side elevational view of the incubator of FIG. 1.

In FIG. 1 and FIG. 2 (illustrating a side elevational view) the frame 12 preferably is of parallelopidal shape. The frame comprises a plurality of sections, including a pair of upper sections 30 and 31 of relatively large diameter and a pair of lower sections 32 and 33, also of relatively large diameter. Transverse sections 34 of relatively small diameter (illustrated particularly in FIG. 2), interconnect the various upper and lower sections.

The materials used for the construction of the frames may be organic or inorganic materials such as metals, composite materials, fiberglass, glass, plastics, and laminates. In a preferred embodiment of the invention, the upper 30, 31, lower 32, 33 and transverse 34 frames are fabricated of hot rolled steel. The dimensions of the frames can vary depending on the size of the fluid to be treated and the amount of treatment needed. The transverse frames are preferably 4 inches high by 6 inches in width and the upper and lower frames are preferably 6 inches high by 12 inches in width. The length of the upper and lower frames can be up to ten's of meters. A preferred size of incubator is 15 meters long by 2 meters wide by 2 meters deep. The incubator of the present invention can also be made much larger and methods of fabricating frame members are well known to those of ordinary skill in the art.

FIGS. 1 and 2 illustrate that individual frame members are also interconnected by a plurality of lateral boundaries or walls. These lateral boundaries include a top boundary 36 (defined by the upper frame sections 30 and 31), sides 38 (defined by the upper sections 30 and 31, lower sections 32 and 33, and the transverse sections 34), and a bottom 39 (defined by the lower sections). These lateral boundaries define a substantially tubular chamber having two opposed ends 40 and 42. In some embodiments of the incubators, the opposed ends 40 and 42 may be closed by additional boundaries (not shown), thus providing a completely closed chamber. Most preferably, however, the opposed ends are not closed but are open to fluid flow. Thus, in the preferred embodiments of the incubator, fluid to be cleaned can freely flow from end to end through the chamber.

A significant feature of the present incubator is that at least one of the lateral boundaries 36 or 38 is made of a light-transmissive material such as glass or plexiglass. These transparent or translucent materials are used to provide for introduction of light into the chamber.

FIGS. 1 and 2 illustrate another significant feature of the present incubator; namely the provision of particulate material 44 disposed intermediate to the ends 40 and 42 of the chamber. Particulate material 44 is designed to enhance the growth of biocatalysts that are capable of oxidizing pollutants or other organic materials present in the fluid. It is well known that growth of biocatalysts, is severely limited by the availability of surface area for attachment and colonization. Thus, by providing a particulate material within the chamber intermediate to ends 40 and 42, the surface area available for attachment and colonization of the biocatalysts is enhanced. In this regard, the particulate matrix can serve as a stimulator of biocatalyst growth. Thus, the present device can function as an incubator of one or more biocatalysts, in addition to its function as a device for cleaning polluted fluids.

Preferably, the particulate material includes a biologically inert substance that will not affect growth of the biocatalyst. Polymers such as polyethylenes (e.g. polytetrafluoroethylene) or polyamides (e.g. nylons) are suitable. Nonpolymers such as stainless steel can also be used. Those of ordinary skill in the art will readily appreciate that a variety of well-known materials, including those that are not biologically inert, can be used as the particulate material.

The particulate material 44 can be of any configuration so long as its presence enhances the growth of the biocatalysts present in the chamber. These configurations include, but are not limited to, mesh-like netting (as illustrated in FIG. 1), a plurality of spherical pellets (as illustrated in FIG. 2), or a honeycomb-like matrix (not shown), all hereinafter referred to as a "particulate matrix". The exact configuration of the biocatalyst-enhancing particulate matrix is not intended to limit the scope of the present invention. For example, a plurality of individual elements having commonly known geometrical shapes can be used as the particulate matrix. The shapes include but are not limited to a plurality of triangles, squares, cones, rectangles, and the like.

Generally, in order to provide an environment in the chamber in which biocatalysts will develop and which is appropriate to the specific condition under which the fluid is to be cleaned, the shape and configuration of the chamber will vary with the requirements of the subject conditions. Size, shape, and materials used in the design of each specific chamber are therefore variable but will be known to those of ordinary skill in the art. Factors such as the compatibility of materials having different characteristics, as well as fluid composition and conditions, volume of fluid medium required for a specific cleaning task, and other factors, are used in determining chamber design and materials. It is sufficient to understand that each chamber is designed of materials which are substantially compatible with the fluid environment and biocatalyst with which it will come into contact. These design parameters can easily be determined by those of ordinary skill in the art.

FIG. 1 illustrates other features of the incubator 10. The chamber 14 is normally moored at some location distant from the edge of the body of fluid 22 it is to clean and it is secured in place by moorings 28 attached to hooks, eyes or other means 46 on the upper sections of the chamber. The chamber 14 can float to the extent shown in FIGS. 1 and 2, that is, having the upper sections 30 and 31 partially under the fluid. It is possible, however, to submerge the chamber fully. Attached to the upper sections can be buoyancy devices 18. Normally, one or more flotation agents 48 are associated with the buoyancy devices 18 to regulate the depth of the chamber 14 below the fluid surface 26.

For example, a flotation agent can be air filled pipes of a known diameter and density which may be used to regulate the depth of the chamber. Specifically, steel pipes will cause the chamber to sink below the fluid surface. Polyethylene pipes, having a lower density, will cause the chamber to float. Other flotation agents can include, but are not limited to, polystyrene floats, the depth of the chamber being regulated by the volume of polystyrene. Other flotation agents can include one or more pumps associated with the buoyancy devices to alter the fluid level therein, thus regulating the depth of the chamber below the fluid surface. These and other flotation agents will be well known to those of ordinary skill in the art.

Because the present incubator includes a provision for flotation 18 and/or guying or mooring 28, the chamber can float on top of fluids or, as required by a specific condition, can operate at any elevation from bottom to the top of the fluid medium.

In some circumstances, the chamber will require no provision for complete or partial flotation and therefore no buoyancy device 18 will be used. In these situations, the chamber 14 may be set either on the bottom 24 of the fluid medium or may be set at any preferred elevation within the fluid medium by means of the moorings attached, as shown in FIG. 1.

An optional pump 20 supported on the chamber is also shown in FIG. 1 and 2. The pumping of air and/or oxygen, nutrients and/or fluid (hereinafter all referred to as "growth media") into the chamber is done by means of one or more pumps 20.

Pump 20 can provide required air and/or oxygen to the fluid 16 within the incubator in sufficient quantity and at a rate of flow compatible with the requirement of the specific design and circumstances. FIGS. 1 and 2 illustrates an embodiment in which the pump 20 is supported on the chamber but in other cases, pump 20 is not supported on the chamber and may be located in or out of the fluid. Alternately, pump 20 may not directly discharge atmospheric air and/or oxygen into the fluid 16 within the incubator but rather, may provide a flow of growth medium (as polluted fluid) through the chamber to compensate for stagnant conditions within the body to be cleaned.

Generally to add growth medium (as oxygen or air) into the fluid-filled incubator, pump 20 may have an air intake extending vertically above the water level and provided at its upper end with a sound muffler (not shown). There could be introduced into the chamber using a variety of well known methods. For example, air can be passed through an airstone or sparger to form bubbles. Alternatively, air can pass through a Venturi system to form the required bubbles. A further method for forming bubbles would be, for example, flexible pipes having a small inside diameter connected to a larger air conduit, the gas escaping from the free ends of the small pipes in the form of bubbles. An exemplary method of forming bubbles of this type can be found in U.S. Pat. No. 4,215,082. If the pump is to provide additional growth media (as fluid flow) through the incubator, a fluid intake may be located at some distance remote from the fluid filled incubator such as, for example, the fluid intake configuration as shown in U.S. Pat. No. 4,350,589.

Growth media (as atmospheric oxygen) can also be introduced into the fluid-filled incubator by means of direct exposure to the atmosphere. In cases where the fluid filled incubator is directly exposed to a suitable source of ambient oxygen, pumping of air and/or oxygen into the fluid may not be required. Pump 20, however, may still be required in order to maintain an adequate flow of fluids through the chamber in order to provide nutrition for the biocatalyst.

Growth media (as inorganic nutrients) such as, for example, nitrogen and phosphorous minerals, are provided to the developing biocatalyst on the particulate matrix by: (i) nutrients existing in the fluid medium, which may increase due to the introduction of added quantities of atmospheric air and/or oxygen, (ii) the introduction of new nutrients to the fluid medium using pump 20; or (iii) introduction of new nutrient directly into the particulate matrix.

In addition, additional biocatalyst can be added to the incubator to augment the already-developing biocatalyst on the particulate matrix. For example, in fluid polluted by an oil spill, indigenous hydrocarbon-degrading bacteria may be present in numbers too low to provide cleaning of the fluid. Introduction of hydrocarbon-degrading bacteria into the incubator by way of pump 20, will provide a "seed" culture for growth on the particulate matrix.

The foregoing description is only illustrative of the principles of the invention. It is to be understood that the invention is not limited to the exact construction as illustrated and described herein. Accordingly, all expedient modifications may be made within the spirit of the invention.

What is claimed is:

1. An apparatus for cleaning polluted fluids by providing an environment for microorganisms to biologically degrade pollutants, said apparatus comprising:

a housing having one or more sidewalls defining an elongated chamber and two ends, said one or more sidewalls being substantially fluid impermeable and having at least one area which is light transmissive, said area being light transmissive defining a section of the housing for orientation towards sunlight, with the ends of said elongated chamber laterally disposed with respect to each other, said light transmissive area for permitting sunlight to enter said chamber to provide energy for photosynthesis and to provide soar heating of the chamber;

bouyancy means secured to the housing providing bouyancy to float the housing above or below fluids in which said housing is placed, to maintain the area which is light transmissive oriented towards the sunlight when the apparatus is placed in polluted fluids and to maintain said ends of said chamber laterally disposed with respect to each other;

a matrix held within said chamber of said housing to provide a support for microorganisms which are capable of acting on the polluted fluids; and circulation means in fluid communication with said chamber for propelling growth media and polluted fluids laterally through the said matrix from end to end to provide microorganisms carried on the matrix with growth conditions for acting on polluted fluids, said housing for placement in a body of polluted fluids with said area which is light transmissive oriented towards sunlight to allow microorganisms held on said matrix to perform a photosynthesis and to provide heat to said chamber, and said circulation means providing a substantially horizontal flow of growth media and polluted fluid to maximize oxygen contact with the microorganisms carried on said matrix and to allow the microorganisms to act on said polluted fluid.

2. The apparatus of claim 1 wherein said matrix comprises a packing of honeycomb, mesh, spheres and other uniformly-shaped objects.

3. The apparatus of claim 1 wherein the matrix comprises a polymeric mesh material.

4. The apparatus of claim 3 wherein the polymeric material is selected from the group consisting of polyesters, polyamides and polyethylenes.

5. The apparatus of claim 1 wherein the light transmissive section is made of polymeric material.

6. The apparatus of claim 5 wherein the polymeric material is selected from the group consisting of glass and plastic .

7. The apparatus of claim 1 wherein the bouyancy means comprises one or more tubes having closed ends which define an enclosure containing a material that has a density less than water to provide bouyancy.

8. The apparatus of claim 1 wherein the circulating means comprises a pump and an inlet, said pump in communication with the housing, for pumping fluids into the inlet, said inlet defining an opening at one of said ends of said housing for receiving polluted fluid and growth media.

9. The apparatus of claim 1 wherein the circulation means introduces a growth media to the chamber comprising the air, oxygen, nutrients and polluted fluid.

* * * * *